(12) United States Patent
Swanburg et al.

(10) Patent No.: US 9,178,972 B2
(45) Date of Patent: *Nov. 3, 2015

(54) SYSTEMS AND METHODS FOR REMOTE DELETION OF CONTACT INFORMATION

(75) Inventors: Scott Swanburg, Duluth, GA (US); Andre Okada, Seattle, WA (US); Paul Hanson, Kirkland, WA (US); Chris Young, Roswell, GA (US)

(73) Assignee: AT&T Mobility II LLC, Atlanta, GA (US)

(*) Notice: Subject to any disclaimer, the term of this patent is extended or adjusted under 35 U.S.C. 154(b) by 392 days.

This patent is subject to a terminal disclaimer.

(21) Appl. No.: 13/296,374

(22) Filed: Nov. 15, 2011

(65) Prior Publication Data

US 2012/0066177 A1 Mar. 15, 2012

Related U.S. Application Data

(63) Continuation of application No. 12/051,336, filed on Mar. 19, 2008, now Pat. No. 8,069,143.

(60) Provisional application No. 60/896,728, filed on Mar. 23, 2007.

(51) Int. Cl.
*G06F 17/30* (2006.01)
*G06F 17/00* (2006.01)
(Continued)

(52) U.S. Cl.
CPC ... *H04M 1/274516* (2013.01); *H04L 29/12047* (2013.01); *H04L 29/12122* (2013.01);
(Continued)

(58) Field of Classification Search
CPC .......... G06F 17/30091; G06F 17/3012; G06F 17/3015; G06F 19/3481; G06F 17/30575; G06F 19/00; G06F 1/163; G06F 3/0482; G06F 3/04883; G06F 3/04886; G06F 13/00; G06F 15/00; G06F 17/00; G06F 17/30; G06F 17/30017; G06F 17/30056
USPC .......... 707/610, 620, 621, 625; 709/206, 219, 709/224

See application file for complete search history.

(56) References Cited

U.S. PATENT DOCUMENTS

| 4,930,077 A | 5/1990 | Fan |
|---|---|---|
| 5,341,414 A | 8/1994 | Popke |

(Continued)

FOREIGN PATENT DOCUMENTS

| EP | 1359777 | 11/2003 |
|---|---|---|
| EP | 1569426 | 8/2005 |

(Continued)

OTHER PUBLICATIONS

U.S. Office Action dated Jul. 16, 2010 in U.S. Appl. No. 12/051,336.
(Continued)

*Primary Examiner* — Yicun Wu
(74) *Attorney, Agent, or Firm* — Hartman & Citrin LLC

(57) ABSTRACT

An exemplary system for providing remote deletion of contact information includes a first device associated with a first user. The first device is configured to generate and send a delete request message to a second device. In some embodiments, the delete request message includes a request to delete contact information for the first user from the second device. The second device can be configured to receive the delete request message and delete the first user's contact information. A method for providing remote deletion of contact information includes a delete request message being generated at a first device, associated with a first user. The delete request message can include a request to delete contact information for the first user. The first device can send the delete request message to a second device. The delete request message can instruct the second device to delete the first user's contact information.

18 Claims, 6 Drawing Sheets

(51) Int. Cl.

| | | |
|---|---|---|
| *H04M 1/2745* | (2006.01) | |
| *H04L 29/12* | (2006.01) | |
| *H04M 1/725* | (2006.01) | |
| *H04L 12/58* | (2006.01) | |
| *H04L 29/08* | (2006.01) | |
| *H04M 3/42* | (2006.01) | |

(52) U.S. Cl.
CPC .......... *H04L29/12132* (2013.01); *H04L 51/28* (2013.01); *H04L 61/1547* (2013.01); *H04L 61/1552* (2013.01); *H04L 61/1594* (2013.01); *H04L 67/1095* (2013.01); *H04M 1/72572* (2013.01); *H04L 29/12169* (2013.01); *H04L 51/14* (2013.01); *H04L 61/1576* (2013.01); *H04M 1/274508* (2013.01); *H04M 3/42382* (2013.01); *H04M 2203/2011* (2013.01); *H04M 2250/10* (2013.01)
USPC .......... 707/610; 707/620; 707/621; 707/625; 709/206; 709/219; 709/224

(56) References Cited

U.S. PATENT DOCUMENTS

| | | | |
|---|---|---|---|
| 5,371,673 | A | 12/1994 | Fan |
| 5,692,032 | A | 11/1997 | Seppanen et al. |
| 5,715,370 | A | 2/1998 | Luther et al. |
| 5,894,506 | A | 4/1999 | Pinter |
| 5,905,959 | A | 5/1999 | Foladare et al. |
| 5,943,399 | A | 8/1999 | Bannister et al. |
| 6,044,275 | A | 3/2000 | Boltz et al. |
| 6,085,201 | A | 7/2000 | Tso |
| 6,138,008 | A | 10/2000 | Dunn et al. |
| 6,182,059 | B1 | 1/2001 | Angotti et al. |
| 6,278,968 | B1 | 8/2001 | Franz et al. |
| 6,278,996 | B1 | 8/2001 | Richardson et al. |
| 6,356,633 | B1 | 3/2002 | Armstrong |
| 6,393,421 | B1 | 5/2002 | Paglin |
| 6,411,947 | B1 | 6/2002 | Rice et al. |
| 6,418,308 | B1 | 7/2002 | Heinonen et al. |
| 6,477,551 | B1 | 11/2002 | Johnson et al. |
| 6,480,484 | B2 | 11/2002 | Morton |
| 6,522,877 | B1 | 2/2003 | Lietsalmi et al. |
| 6,622,021 | B1 | 9/2003 | Takala |
| 6,718,367 | B1 | 4/2004 | Ayyadurai |
| 6,718,368 | B1 | 4/2004 | Ayyadurai |
| 6,938,068 | B1 | 8/2005 | Kraft et al. |
| 7,058,652 | B2 | 6/2006 | Czarnecki et al. |
| 7,137,070 | B2 | 11/2006 | Brown et al. |
| 7,149,782 | B2 | 12/2006 | Sommerer |
| 7,225,232 | B2 | 5/2007 | Elberse |
| 7,280,818 | B2 | 10/2007 | Clayton |
| 7,363,246 | B1 | 4/2008 | Van Horn et al. |
| 7,383,250 | B2 | 6/2008 | Scian et al. |
| 7,418,496 | B2 | 8/2008 | Macey et al. |
| 7,546,131 | B1 | 6/2009 | Sidi et al. |
| 7,552,178 | B2 | 6/2009 | Chen et al. |
| 7,619,584 | B2 | 11/2009 | Wolf |
| 7,650,157 | B2 | 1/2010 | Clayton |
| 7,657,250 | B2 | 2/2010 | Clayton |
| 7,657,600 | B2 | 2/2010 | Auhagen |
| 7,756,535 | B1 | 7/2010 | Diao et al. |
| 7,844,666 | B2 | 11/2010 | Horvitz et al. |
| 7,925,620 | B1 | 4/2011 | Yoon |
| 7,996,372 | B2 | 8/2011 | Rubel, Jr. |
| 8,069,143 | B2 | 11/2011 | Swanburg et al. |
| 8,078,978 | B2 | 12/2011 | Perry et al. |
| 8,249,920 | B2 | 8/2012 | Smith |
| 8,380,566 | B2 | 2/2013 | Smith |
| 8,396,450 | B2 | 3/2013 | Clayton |
| 8,645,468 | B2 | 2/2014 | O'Sullivan et al. |
| 8,849,730 | B2 | 9/2014 | Winn et al. |
| 8,893,023 | B2 | 11/2014 | Perry et al. |
| 8,954,510 | B2 | 2/2015 | Chen et al. |
| 2001/0041566 | A1 | 11/2001 | Xanthos et al. |
| 2002/0007346 | A1 | 1/2002 | Qiu et al. |
| 2002/0035684 | A1 | 3/2002 | Vogel et al. |
| 2002/0138582 | A1 | 9/2002 | Chandra et al. |
| 2002/0169841 | A1 | 11/2002 | Carlson et al. |
| 2002/0178041 | A1 | 11/2002 | Krantz et al. |
| 2003/0154256 | A1 | 8/2003 | Hadano et al. |
| 2003/0193951 | A1 | 10/2003 | Fenton et al. |
| 2004/0052342 | A1 | 3/2004 | Jugovec et al. |
| 2004/0059700 | A1 | 3/2004 | Park et al. |
| 2004/0128151 | A1* | 7/2004 | Mock et al. ............ 705/1 |
| 2004/0208297 | A1 | 10/2004 | Valentine |
| 2004/0230689 | A1 | 11/2004 | Loveland |
| 2005/0021551 | A1 | 1/2005 | Silva et al. |
| 2005/0021636 | A1 | 1/2005 | Kumar |
| 2005/0074169 | A1 | 4/2005 | Filatov et al. |
| 2005/0076110 | A1 | 4/2005 | Mathew et al. |
| 2005/0120084 | A1 | 6/2005 | Hu et al. |
| 2005/0198582 | A1 | 9/2005 | Hennum et al. |
| 2005/0199714 | A1 | 9/2005 | Brandt et al. |
| 2005/0209861 | A1 | 9/2005 | Hewes et al. |
| 2006/0030297 | A1 | 2/2006 | Coble et al. |
| 2006/0052091 | A1 | 3/2006 | Onyon et al. |
| 2006/0095575 | A1 | 5/2006 | Sureka et al. |
| 2006/0104429 | A1 | 5/2006 | Wouterse et al. |
| 2006/0115062 | A1 | 6/2006 | Gonder et al. |
| 2006/0149819 | A1 | 7/2006 | Auhagen |
| 2006/0167834 | A1 | 7/2006 | Rubel, Jr. |
| 2006/0168065 | A1 | 7/2006 | Martin |
| 2006/0205416 | A1 | 9/2006 | Kayzar et al. |
| 2006/0246881 | A1 | 11/2006 | Winkler et al. |
| 2006/0250987 | A1 | 11/2006 | White et al. |
| 2006/0253537 | A1 | 11/2006 | Thomas |
| 2006/0274721 | A1 | 12/2006 | Flanagan |
| 2006/0277139 | A1 | 12/2006 | Poltorak |
| 2006/0277176 | A1 | 12/2006 | Liao |
| 2007/0022099 | A1 | 1/2007 | Yoshimura et al. |
| 2007/0026852 | A1 | 2/2007 | Logan et al. |
| 2007/0038942 | A1 | 2/2007 | Chen et al. |
| 2007/0064920 | A1 | 3/2007 | Ruckart |
| 2007/0073810 | A1 | 3/2007 | Adams et al. |
| 2007/0088798 | A1 | 4/2007 | Merrill et al. |
| 2007/0100631 | A1 | 5/2007 | Bodin et al. |
| 2007/0136431 | A1 | 6/2007 | Sun |
| 2007/0155411 | A1 | 7/2007 | Morrison |
| 2007/0233736 | A1 | 10/2007 | Xiong et al. |
| 2007/0249379 | A1 | 10/2007 | Bantukul |
| 2007/0266118 | A1 | 11/2007 | Wilkins |
| 2007/0266156 | A1 | 11/2007 | Wilkins |
| 2007/0288576 | A1 | 12/2007 | Illg |
| 2008/0004005 | A1 | 1/2008 | Jensen |
| 2008/0046807 | A1 | 2/2008 | Margitich et al. |
| 2008/0077468 | A1 | 3/2008 | Raskin |
| 2008/0109735 | A1 | 5/2008 | Vuong |
| 2008/0133677 | A1 | 6/2008 | Pattabhiraman et al. |
| 2008/0189293 | A1 | 8/2008 | Strandel et al. |
| 2008/0235242 | A1 | 9/2008 | Swanburg et al. |
| 2008/0250332 | A1 | 10/2008 | Farrell |
| 2008/0300982 | A1 | 12/2008 | Larson et al. |
| 2009/0022285 | A1 | 1/2009 | Swanburg et al. |
| 2009/0282114 | A1 | 11/2009 | Feng et al. |
| 2009/0285129 | A1 | 11/2009 | Swanburg et al. |
| 2010/0179991 | A1 | 7/2010 | Lorch et al. |
| 2010/0287241 | A1 | 11/2010 | Swanburg et al. |
| 2012/0089925 | A1 | 4/2012 | Perry et al. |
| 2012/0166561 | A1 | 6/2012 | Kelly |

FOREIGN PATENT DOCUMENTS

| | | |
|---|---|---|
| EP | 1755294 | 2/2007 |
| EP | 1918825 | 5/2008 |
| WO | 9949679 | 9/1999 |
| WO | 02087197 | 10/2002 |
| WO | 2005015927 | 2/2005 |
| WO | 2008118878 | 10/2008 |

OTHER PUBLICATIONS

U.S. Office Action dated Dec. 27, 2010 in U.S. Appl. No. 12/051,336.
U.S. Notice of Allowance dated Jul. 15, 2011 in U.S. Appl. No. 12/051,336.

(56) References Cited

OTHER PUBLICATIONS

U.S. Office Action dated Sep. 21, 2011 in U.S. Appl. No. 12/053,525.
U.S. Office Action dated Aug. 6, 2012 in U.S. Appl. No. 12/053,525.
U.S. Office Action dated Dec. 23, 2010 in U.S. Appl. No. 12/279,756.
U.S. Office Action dated Jul. 8, 2011 in U.S. Appl. No. 12/279,756.
U.S. Office Action dated Sep. 15, 2010 in U.S. Appl. No. 12/053,512.
U.S. Office Action dated Mar. 1, 2011 in U.S. Appl. No. 12/053,512.
U.S. Office Action dated Jul. 6, 2011 in U.S. Appl. No. 12/053,512.
U.S. Office Action dated Feb. 9, 2012 in U.S. Appl. No. 12/053,512.
U.S. Office Action dated Oct. 12, 2012 in U.S. Appl. No. 12/053,512.
U.S. Office Action dated Dec. 7, 2009 in U.S. Appl. No. 11/873,031.
U.S. Office Action dated May 26, 2010 in U.S. Appl. No. 11/873,031.
U.S. Office Action dated Feb. 16, 2012 in U.S. Appl. No. 11/873,031.
U.S. Office Action dated Jul. 25, 2012 in U.S. Appl. No. 11/873,031.
Pearlman, L., "A Community Authorization Service for Group Collaboration," Jun. 2002, IEEE 3rd International Workshop, pp. 50-59.
"3rd Generation Partnership Project; Technical Specification Group Services and System Aspects; Support of SMS and MMS Over Generic 3GPP IP Access," 3GPP TR 23.804 v7.1.0 (Sep. 2005).
Office Action mailed on Sep. 11, 2013 in U.S. Appl. No. 12/279,756.
Notice of Allowance mailed on Mar. 6, 2014 in U.S. Appl. No. 12/053,525.
Office Action mailed on Apr. 8, 2014 in U.S. Appl. No. 12/279,756.
International Application No. PCT/US2008/058052 Written Opinion dated Sep. 29, 2009.
International Application No. PCT/US2008/058052 International Search Report dated Oct. 7, 2008.
International Application No. PCT/US2008/058055 Written Opinion dated Sep. 29, 2009.
International Application No. PCT/US2008/058055 International Search Report dated Jul. 3, 2009.
International Application No. PCT/US2008/058057 Written Opinion dated Sep. 29, 2009.
International Application No. PCT/US2008/058057 International Search Report dated Jul. 7, 2008.
International Application No. PCT/US2008/058064 Written Opinion dated Sep. 29, 2009.
International Application No. PCT/US2008/058064 International Search Report dated Aug. 21, 2008.
International Application No. PCT/US2008/058067 Written Opinion dated Sep. 29, 2009.
International Application No. PCT/US2008/058067 International Search Report dated Oct. 27, 2008.
Office Action mailed Oct. 21, 2014, in U.S. Appl. No. 12/279,756.
Office Action mailed Mar. 30, 2015 in U.S. Appl. No. 12/279,756.
Office Action mailed May 11, 2015 in U.S. Appl. No. 14/669,372.
U.S. Notice of Allowance mailed Aug. 24, 2015 in U.S. Appl. No. 12/279,756.
U.S. Office Action mailed Sep. 9, 2015 in U.S. Appl. No. 12/053,525.
U.S. Office Action mailed Sep. 15, 2015 in U.S. Appl. No. 14/669,372.

* cited by examiner

SYSTEMS AND METHODS FOR REMOTE DELETION OF CONTACT INFORMATION

CROSS REFERENCE TO RELATED APPLICATIONS

This application is a continuation of U.S. patent application Ser. No. 12/051,336, filed Mar. 19, 2008, now U.S. Pat. No. 8,069,143, which claims priority to U.S. Provisional Application No. 60/896,728, filed Mar. 23, 2007, the entireties of which are hereby incorporated by reference.

TECHNICAL FIELD

The present application relates generally to the exchange of contact information in a communication system and, more particularly, to systems and methods for remote deletion of contact information.

BACKGROUND

Mobile communications devices, such as cellular telephones, include memory to store contact information. This contact information is typically arranged in an address book (also known as a contact list) and can include name, address information, telephone numbers, and email addresses, for example. Many of these address book systems offer features such as speed dial, voice dial, custom ringtones, and images to enhance the look of the address book and user experience of using the address book. Address book options allow for various communication methods including voice call, messaging, and email.

Typically, contact information is shared and manually entered by a user or acquired by an electronic business card, such as a vCard, for example. A person that receives the contact information is free to save or delete the contact information at will.

SUMMARY

The present application provides various systems and methods for remote deletion of contact information. In a first system of the present application, a first device, associated with a first user, is configured to generate and send a delete request message to a second device, associated with a second user. The delete request message can include a request to delete contact information for the first user from the second device. The second device can be configured to receive the delete request message and delete the contact information associated with the first user.

In a first method of the present application, a delete request message is generated at a first device, associated with a first user. The delete request message can include a request to delete contact information for the first user. The first device can send the delete request message to a second device, associated with a second user. Upon receipt at the second device, the delete request message can instruct the second device to delete the contact information associated with the first user.

In another system of the present application, a first device, associated with a first user, includes a first local contact database and a first messaging application. The first messaging application can be configured to receive, as input, a character string and a destination telephone number. The first messaging application can use the character string and destination telephone number to generate a delete request message and send the delete request message to the destination telephone number. The delete request message can be used to request contact information for the first user to be deleted from a second device associated with the destination telephone number. The second device, associated with a second user, can include a second local contact database and a second messaging application. The second local contact database can include the contact information associated with the first user. The messaging application can be configured to receive the delete request message sent from the first device and delete the contact information associated with the first user.

In another method of the present application, an input is received on a first device, associated with a first user. The input can include a character string and a destination number. The first device can generate a delete request message with the character string and the destination number and send the delete request message to a second device identified by the destination number. The delete request message is received at the second device and the contact information associated with the first user that is stored on the second device is deleted.

In yet another system of the present application, a network database includes a first network contact database entry and a second network contact database entry that is capable of being synched with a first local contact database and a second local contact database, respectively. The second network contact database entry can include contact information associated with a first user. The system also includes a first device, associated with the first user, that includes the first local contact database and a messaging application. The messaging application can be configured to receive, as input, a destination telephone number, a character string, and a network contact database number. The messaging application can be further configured to use the destination telephone number, the character string, and the network contact database number to generate a delete request message and send the delete request message to the network contact database. The delete request message can be used to request that the contact information associated with the first user be deleted from the second network contact database entry identified by the destination telephone number. After the contact information associated with the first user is deleted from the second network contact database entry, a synchronization process can be initialized between the network contact database and a second device. The second device, associated with a second user, can include the second local contact database. The second local contact database can include the contact information associated with the first user prior to being deleted via the synchronization process.

In yet another method of the present application, a delete request message is received at a network contact database from a first device associated with a first user. The delete request message can include a network contact database number identifying the network contact database and a destination number identifying a network contact database entry within the network contact database that corresponds to a second user that is associated with a second device. The second device can include a local contact database. The network contact database can delete the contact information associated with the first user that is stored within the network contact database entry. The network contact database can perform a synchronization process between the local contact database and the network contact database thereby deleting the contact information from a local contact database stored on the second device.

DETAILED DESCRIPTION

As required, detailed embodiments of the present application are disclosed herein. It must be understood that the disclosed embodiments are merely exemplary examples of the application that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present application. Therefore, specific structural and functional details disclosed herein are not to be interpreted as limiting, but merely as a basis for the claims and as a representative basis for teaching one skilled in the art to variously employ the present application.

Figure 1:
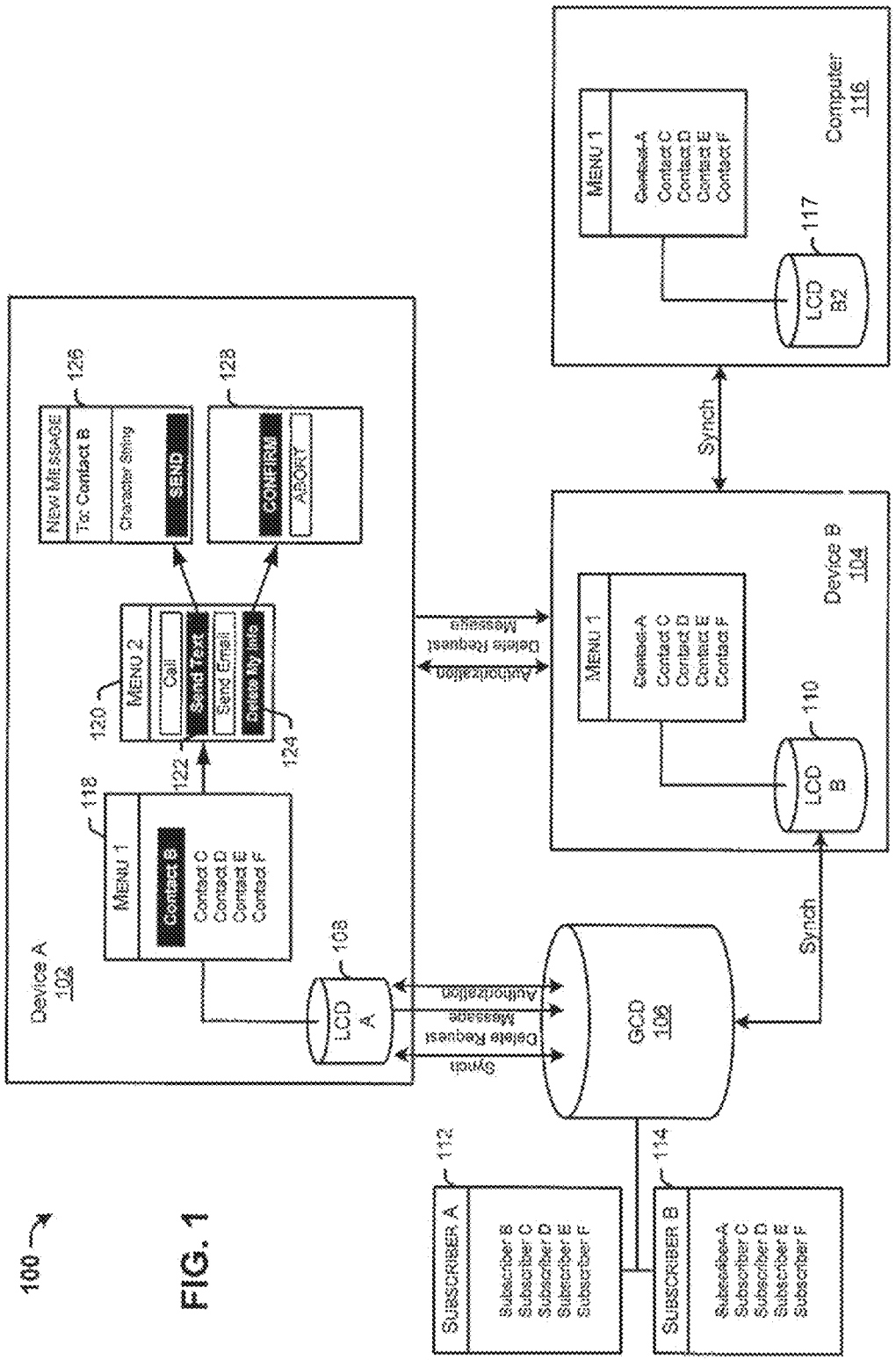
FIG. 1 schematically illustrates a system for remote deletion of contact information in accordance with an embodiment of the present application.

Referring to the drawings wherein like numerals represent like elements throughout the several views, FIG. 1 illustrates a system 100 for providing functions to remotely delete contact information. The illustrated system 100 includes a first device, device A 102, that is illustrated as being in communication with a second device, device B 104, and a global contact database (GCD) 106.

Device A 102 and device B 104 each include a local contact database (LCD), LCD A 108 and LCD B 110, respectively. The LCDs 108, 110 are configured to store contact information for at least one person, business, voicemail system, emergency call center (e.g., 911), and the like. Contact information can include, but is not limited to, phone numbers, ringtones, email addresses, websites, and other identifying information for a contact, such as likes, dislikes, birthday, other important dates, and the like.

The GCD 106 is configured to store LCD entries for a plurality of subscribers in a network, such as a wireless communications network. For example, the GCD 106 can be configured to store the information stored in LCD A 108 and the information stored in LCD B 110. Each database entry is associated with a subscriber. Accordingly, as illustrated, GCD 106 can include a database entry for subscriber A 112 and a database entry for subscriber B 114. As illustrated, each database entry 112, 114 can include the same contact information as is stored in the LCDs 108, 110.

Generally, the system 100 provides a remote deletion function so that a first user, operating device A 102, for example, can send a delete request message to device B 104. The delete request message includes a request to delete the first user's contact information from LCD B 110. Several exemplary embodiments of delete request messages will be described below.

Device B 104 is also in communication with a computer 116 for synching contact information between LCD B 110 and LCD B2 117. The computer 116 can be, but is not limited to, a desktop computer, a tower computer, a laptop computer, a notebook computer, a tablet computer, a handheld computer, a server, a web server, or other device capable of performing the synchronization process described below.

In some instances, a user may synchronize LCD B 110 and LCD B2 117 to retrieve any contact information that is remotely deleted at the request of another user. To prevent this, the LCD B 110 or device B 104 can include an instruction, flag, or trigger, for example, to prevent information from being transferred to the LCD B 110. In addition, when connected to the computer 116, device B 104 can forward the delete request message to the computer 116 and delete the contact information. Alternatively, if contact information remains on LCD B2 117 and a user enters a telephone number or email address that was previously deleted from LCD B 110 using a remote delete function, then device B 104 can prevent the user from placing the call, for example.

In one embodiment, the delete request message is a text message including a destination number, such as, the telephone number of device B 104, and a character string. The destination number can identify the device from which contact information is to be deleted. The destination number can be entered manually or selected from a contact list menu 118.

The contact list menu 118 is illustrated as including contact entries for contact B, contact C, contact D, contact E, and contact F. Contact B is selected and upon selection an option menu 120 can be presented. The option menu 120 can include any number of options, including, but not limited to, a call option, a send text option 122, a send email option, and a delete my info option 124. The send text option 122, when selected, can present a new message screen 126. A user can enter the destination number and a character string. The text message screen 126 can be configured to automatically populate the recipient and the corresponding destination number (in this example, contact B). The user can manually enter a character string that can be identified as a request to delete contact information.

The character string can include a keyword that is associated with a delete function. For example, a text message sent to device B 104 with the keyword "delete" can be received by device B 104. Device B 104 can be instructed by the keyword to delete contact information associated with the source number, i.e., subscriber A's contact information associated with the telephone number for device A 102.

In another embodiment, the character string includes a telephone number and a keyword. For example, "delete 555-555-5555" can be received by device B 104 and device B 104 can be instructed by the character string to delete contact information associated with the number "555-555-5555." Accordingly, the telephone number can be a redundant entry of the source number (since the source number is provided in the "from" field of a text message), or another telephone number, such as a telephone number for another device owned by subscriber A.

Alternatively, the delete my info option 124 can be selected from the option menu 120. The delete my info option 124 is configured to automatically generate and populate a delete request message directed to the selected contact. The delete message is configured to request the destination device to delete contact information associated with the user of the source device, for example, device A 102. Upon selecting the delete my info option 124, a confirmation screen 128 can be presented. The confirmation screen 128 can include an option to confirm that the user would like to send the delete request message or abort the delete request message.

The aforementioned embodiments can be used by a subscriber to request the deletion of his or her information without any prior authorization. In some instances, however, the delete message may have been sent by accident. Accordingly, additional embodiments are provided wherein an authorization is required before a remote deletion process can be completed.

In one embodiment, device A 102 and device B 104 can initiate an authorization session wherein a set of authorization rules are established among the devices 102, 104. The authorization session can be initiated at the time contact information is exchanged or at any other time, for example.

By way of example, an authorization rule can be a setting or other indication on a first device, such as device B 104, that authorizes the completion of a delete request received from a second device, such as device A 102. Likewise, a setting or other indication on device A 102 can be used to authorize the completion of a delete request received from device B 104.

By way of further example, an authorization rule can be a key, a password, or other authorization mechanism. It is contemplated that the authorization mechanism can be chosen by the device users or selected by a network entity and sent to each device. The authorization mechanism can be automatically entered upon selection of the delete my info option 124. The authorization key can be the character string or a portion thereof sent in the delete request message. In any case, the user can be prompted to enter or reenter the authorization key prior to sending the delete request message.

Figure 2:
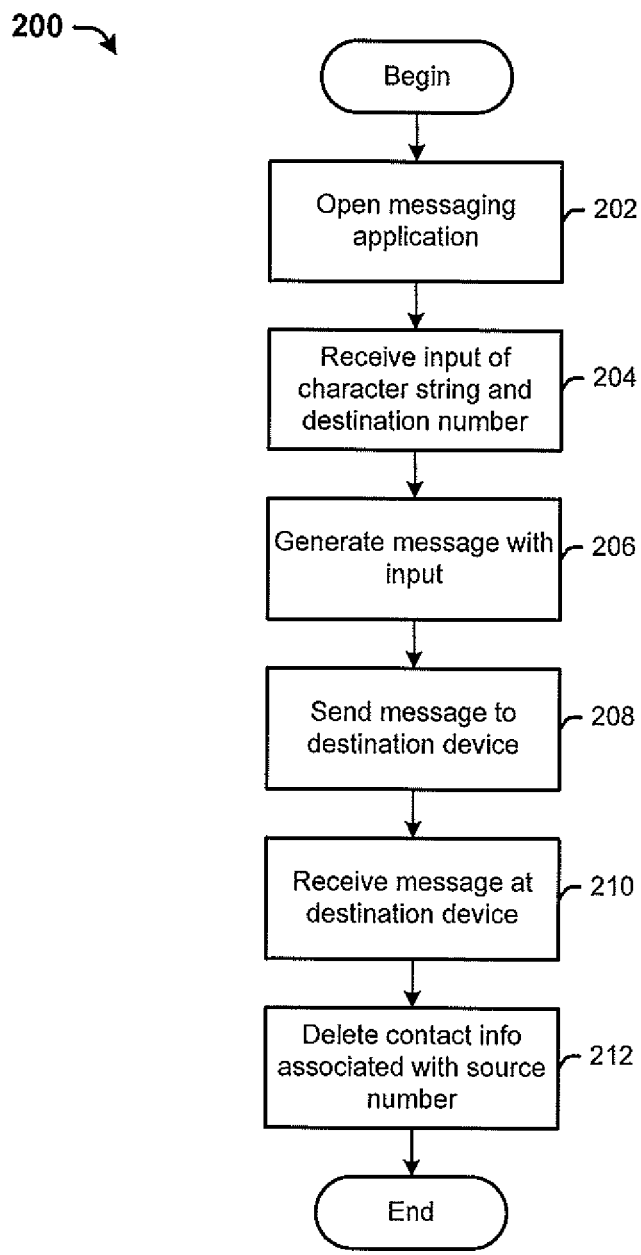
FIG. 2 schematically illustrates a method for remotely deleting contact information in accordance with one embodiment of the present application.

Referring now to FIG. 2, a method 200 for remotely deleting contact information is schematically illustrated in accordance with one embodiment of the present application. It should be understood that the steps described are not necessarily presented in any particular order and performance of some or all the steps in an alternative order is possible and contemplated. The steps have been presented in the demonstrated order for ease of description and illustration. Steps can be added, omitted, and/or performed simultaneously without departing from the scope of the appended claims. Some or all steps of this process, and/or substantially equivalent steps, can be performed by execution of computer-readable instructions included on a computer-readable medium. The method 200 is now described with reference to FIG. 1.

The method 200 begins and flow proceeds to step 202 wherein a messaging application is opened on a device, such as, device A 102, for example. Flow then proceeds to step 204 wherein the messaging application receives an input of the character string and a destination number. The destination number, for purposes of this example, is the telephone number for device B 104.

As described above, the character string and destination number can be populated automatically via the delete my info option 124 or entered manually in a text message. Regardless of the method by which the character string and destination number are entered, a delete request message is generated from the input, at step 206. At step 208, the delete request message is sent to the device B 104. At step 210, the delete request message is received at the device B 104. At step 212, device B 104 deletes the contact information associated with the source telephone number. The method ends.

Figure 3:
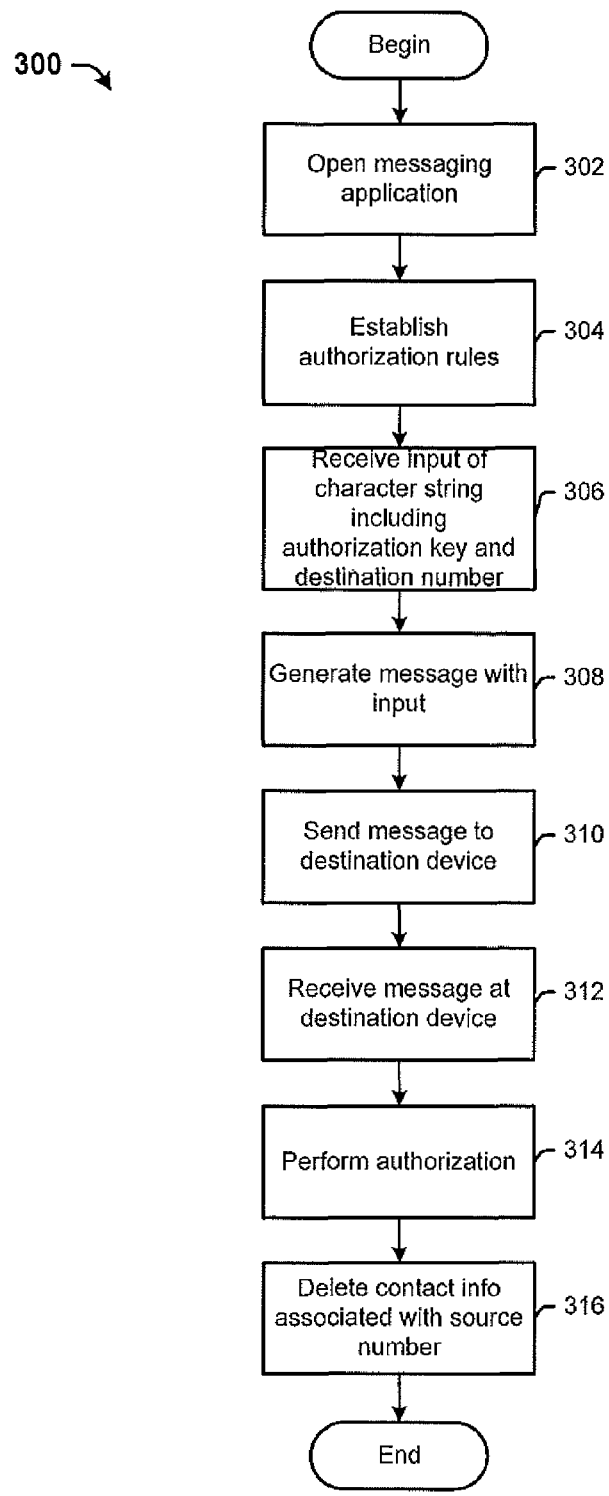
FIG. 3 schematically illustrates a method for remotely deleting contact information in accordance with another embodiment of the present application.

Referring now to FIG. 3, a method 300 for remotely deleting contact information is schematically illustrated in accordance with another embodiment of the present application. It should be understood that the steps described are not necessarily presented in any particular order and performance of some or all the steps in an alternative order is possible and contemplated. The steps have been presented in the demonstrated order for ease of description and illustration. Steps can be added, omitted, and/or performed simultaneously without departing from the scope of the appended claims. Some or all steps of this process, and/or substantially equivalent steps, can be performed by execution of computer-readable instructions included on a computer-readable medium. The method 300 is now described with reference to FIG. 1.

The method 300 begins and flow proceeds to step 302 wherein a messaging application is opened on a device, such as, device A 102, for example. Flow then proceeds to step 304 wherein authorization rules are established among the devices 102, 104. As described above, an authorization rule can be a setting or other indication on device B 104 that authorizes the completion of a delete request received from device A 102. Likewise, a setting or other indication on device A 102 can be used to authorize the completion of a delete request received from device B 104. As also described above, an authorization rule can be a key, a password, or other authorization mechanism. It is contemplated that the authorization mechanism can be chosen by the device users or selected by a network entity and sent to each device.

After any authorization rules are established, flow proceeds to step 306 wherein the messaging application receives an input of the character string including any applicable authorization key, and a destination number. The destination number, for purposes of this example, is the telephone number for device B 104. As described above, the character string and destination number can be populated automatically via the delete my info option 124 or entered manually in a text message. Regardless of the method by which the character string and destination number are entered, a delete request message is generated from the input, at step 308. At step 310, the delete request message is sent to device B 104. At step 312, the delete request message is received at device B 104. At step 314, device B 104 performs an authorization, for example, by comparing the authorization key received in the delete request message and to the authorization key stored in device B 104. At step 316, device B 104 deletes the contact information associated with the source telephone number. The method ends.

Figure 4:
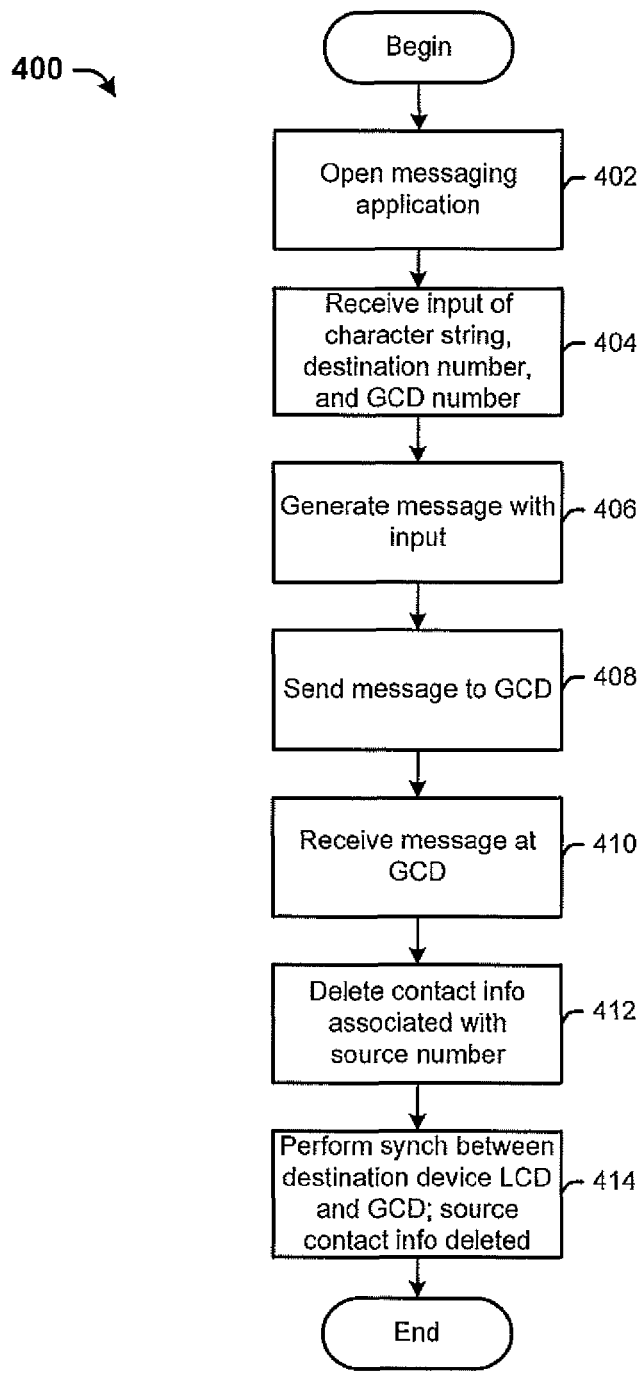
FIG. 4 schematically illustrates a method for remotely deleting contact information in accordance with yet another embodiment of the present application.

Referring now to FIG. 4, a method 400 for remotely deleting contact information from a global contact database is illustrated in accordance with an embodiment of the present application. It should be understood that the steps described are not necessarily presented in any particular order and performance of some or all the steps in an alternative order is possible and contemplated. The steps have been presented in the demonstrated order for ease of description and illustration. Steps can be added, omitted, and/or performed simultaneously without departing from the scope of the appended claims. Some or all steps of this process, and/or substantially equivalent steps, can be performed by execution of computer-readable instructions included on a computer-readable medium. The method 400 is now described with reference to FIG. 1.

The method 400 provides for remote deletion of contact information from the GCD 106. The GCD 106 can be synchronized with the device LCDs, LCD A 108 and LCD B 110. A synchronization process can occur periodically or upon request from a device, such as device B 104, for example.

The delete request message is sent to a telephone number or short code associated with the GCD 106. The destination number can be included in the character string along with a keyword for the request to delete contact information from the database entry for the destination number.

The method 400 begins and flow proceeds to step 402 wherein a messaging application is opened on a device, such as, device A 102, for example. Flow then proceeds to step 404 wherein the messaging application receives an input of the character string, a destination number, and the GCD 106 telephone number or short code. The destination number, for purposes of this example, is the telephone number for device B 104. As described above, the character string and destination number can be populated automatically via the delete my info option 124 or entered manually in a text message. Regardless of the method by which the character string and destination number are entered, a delete request message is generated from the input, at step 406. At step 408, the delete request message is sent to the GCD 106. At step 410, the delete request message is received at the GCD 106. At step 412, the GCD 106 deletes the contact information associated with the source telephone number. The method 400 then proceeds to step 414 wherein the GCD 106 performs a synchronization process with LCD B 110 such that the contact information stored in LCD B 110 no longer includes the contact information for subscriber A. The method ends.

Figure 5:
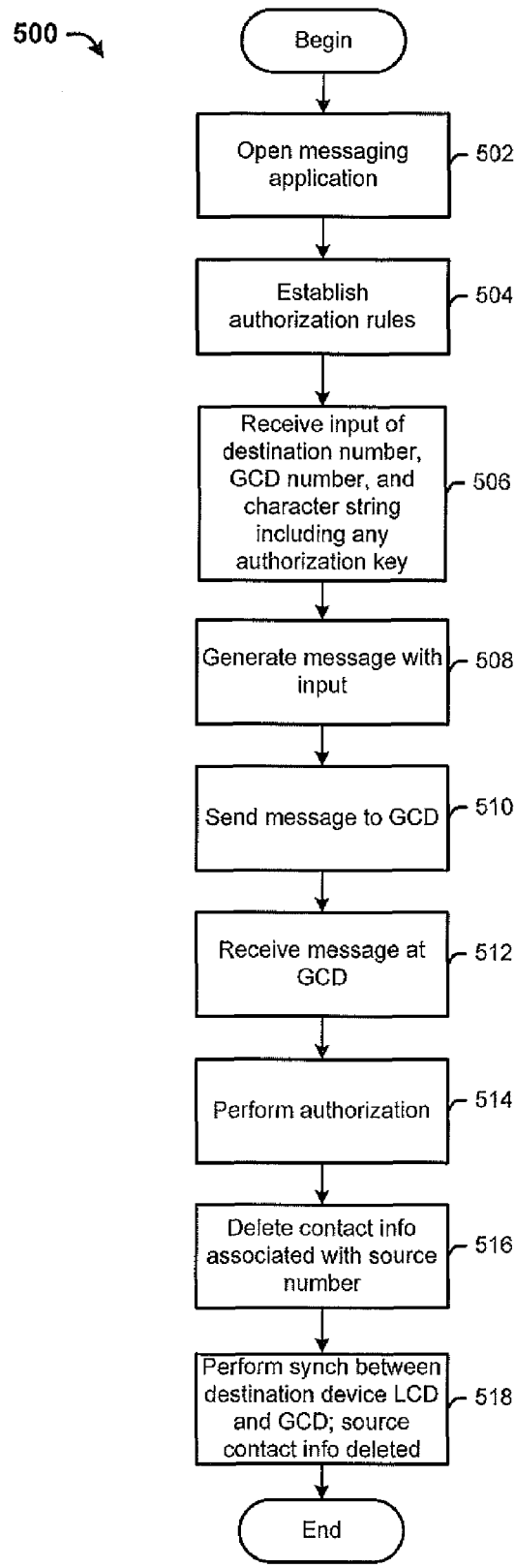
FIG. 5 schematically illustrates a method for remotely deleting contact information in accordance with another embodiment of the present application.

Referring now to FIG. 5, a method for remotely deleting contact information from a global contact database is illustrated in accordance with another embodiment of the present application. It should be understood that the steps described are not necessarily presented in any particular order and performance of some or all the steps in an alternative order is possible and contemplated. The steps have been presented in the demonstrated order for ease of description and illustration. Steps can be added, omitted, and/or performed simultaneously without departing from the scope of the appended claims. Some or all steps of this process, and/or substantially equivalent steps, can be performed by execution of computer-readable instructions included on a computer-readable medium. The method 500 is now described with reference to FIG. 1.

The method 500 begins and flow proceeds to step 502 wherein a messaging application is opened on a device, such as, device A 102, for example. Flow then proceeds to step 504 wherein authorization rules are established. An authorization rule can include a setting or other indication within the GCD 106 to authorize a user to remotely deleting contact information from any destination number or a select group of destination numbers. Alternatively, the authorization rule can include an authorization key, password, or other authorization mechanism.

After any authorization rules are established, flow proceeds to step 506 wherein the messaging application receives an input of the character string, a destination number, and the GCD 106 telephone number or short code. The destination number, for purposes of this example, is the telephone number for device B 104. As described above, the character string and destination number can be populated automatically via the delete my info option 124 or entered manually in a text message. Regardless of the method by which the character string and destination number are entered, a delete request message is generated from the input, at step 508. At step 510, the delete request message is sent to the GCD 106. At step 512, the delete request message is received at the GCD 106 and the GCD 106 performs an authorization for the delete request message at step 514 in accordance with the authorization rules defined in step 504. At step 516, the GCD 106 deletes the contact information associated with the source telephone number. The method 400 then proceeds to step 518 wherein the GCD 106 performs a synchronization process with LCD B 110 such that the contact information stored in LCD B 110 no longer includes the contact information for subscriber A. The method ends.

Figure 6:
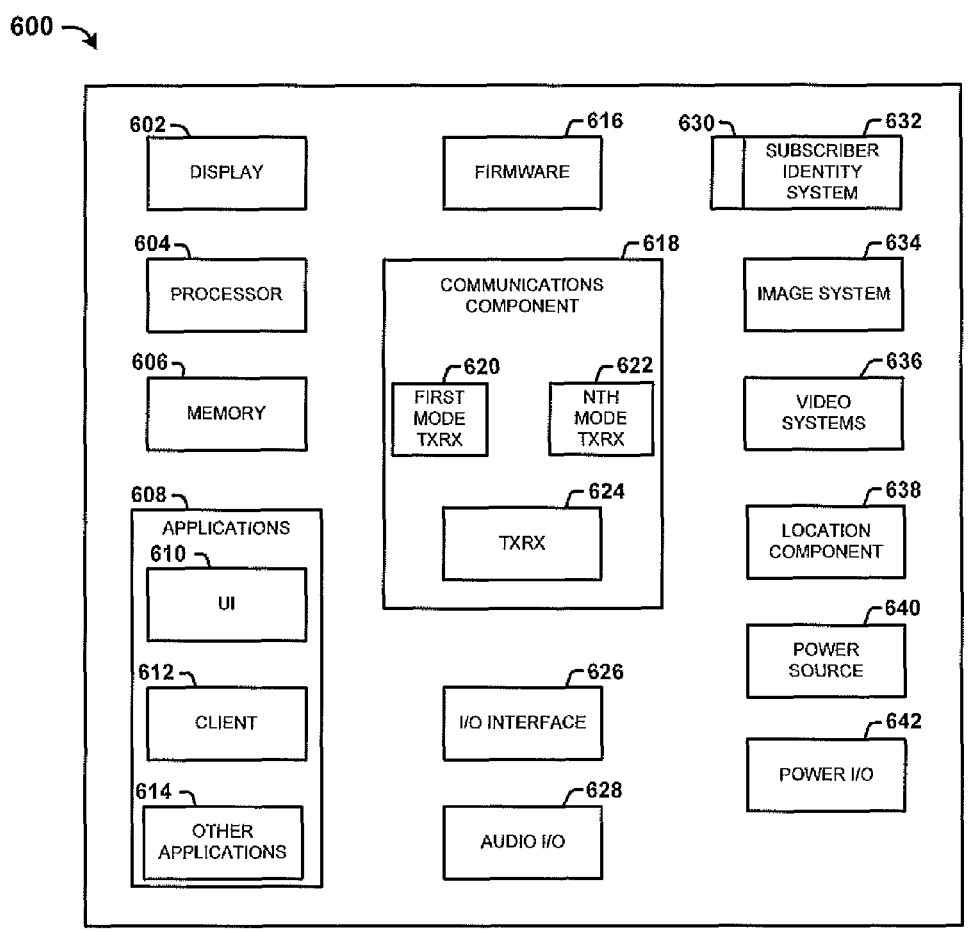
FIG. 6 schematically illustrates an exemplary device configured with a messaging application in accordance with an embodiment of the present application.

Referring now to FIG. 6, a block diagram illustrating various components of an exemplary device 600 is shown, according to the present application. Although no connections are shown between the components illustrated and described in FIG. 6, the components can interact with each other to carry out device functions.

As illustrated, the device 600 can be a single-mode or multi-mode mobile communications device. FIG. 6 and the following discussion are intended to provide a brief, general description of a suitable environment in which the various aspects of an embodiment of the present application can be implemented. While the description includes a general context of computer-executable instructions, the present application can also be implemented in combination with other program modules and/or as a combination of hardware and software. Particular processes carried out by the device 600 are described in greater detail with reference to FIGS. 2-5. These processes can be carried out via applications stored within a memory on the device 600.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 600 includes a display 602 for displaying multimedia such as, for example, text, images, video, telephony functions, caller line ID data, setup functions, menus, messages, wallpaper, graphics, and the like. The device 600 also includes a processor 604 for controlling and/or processing data. A memory 606 can interface with the processor 604 for the storage of data and/or applications 608. The memory 606 can include a variety of computer readable media including, but not limited to, volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD-ROM, DVD, or other optical disk storage, magnetic tape, magnetic disk storage, other magnetic storage devices, or any other medium that can be used to store the desired information and that can be accessed by the device 600.

The memory 606 can be configured to store one or more applications 608, such as, for example, a messaging application that provides a remote delete function. The applications 608 can also include a user interface (UI) application 610. The UI application 610 can interface with a client 612 (e.g., an operating system) to facilitate user interaction with device functionality and data, for example, answering/initiating calls, entering/deleting data, configuring settings, address book manipulation, multi-mode interaction, responding to update offers, and the like. The applications 608 can include other applications 614 such as, for example, a messaging application. The applications 608 can be stored in the memory 606 and/or in a firmware 616, and can be executed by the processor 604. The firmware 616 can also store code for execution during initialization of the device 600.

A communications component 618 can interface with the processor 604 to facilitate wired/wireless communications with external systems including, for example, cellular networks, VoIP networks, LAN, WAN, MAN, PAN, that can be implemented using WiFi, WiMax, combinations and/or improvements thereof, and the like. The communications component 618 can also include a multi-mode communications subsystem for providing cellular communications via different cellular technologies. For example, a first cellular transceiver 620 can operate in one mode, for example, GSM, and an Nth transceiver 622 can operate in a different mode, for example WiFi. While only two transceivers 620, 622 are illustrated, it should be appreciated that a plurality of transceivers can be included. The communications component 618 can also include a transceiver 624 for unlicensed RF communications using technology such as, for example, WiFi, WiMAX, near-field communications, other RF and the like. The transceiver 624 can also be configured for line-of-sight technologies, such as, infrared and IRDA, far example. Although a single transceiver 624 is illustrated, multiple transceivers for unlicensed RF and line-of-sight technologies are contemplated.

The communications component 618 can also facilitate communications reception from terrestrial radio networks, digital satellite radio networks, Internet-based radio services networks, combinations thereof, and the like. The communications component 618 can process data from a network, such as, for example, the Internet, a corporate WAN, an intranet, a home broadband network, and the like, via an ISP, DSL provider, or other broadband service provider.

An input/output (I/O) interface 626 can be provided for input/output of data and/or signals. The I/O interface 626 can be a hardwire connection, such as, for example, a USB, PS2, IEEE 1394, serial, parallel, IEEE 802.3 (e.g., Ethernet— RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, multi-touch screen, touch pad, trackball, joy stick, controller, monitor, display, LCD, plasma, OLED, combinations thereof, and the like.

Audio capabilities can be provided by an audio I/O component 628 that can include a speaker (not shown) for the output of audio signals and a microphone (not shown) to collect audio signals.

The device 600 can include a slot interface 630 for accommodating a subscriber identity system 632, such as, for example, a SIM or universal SIM (USIM). The subscriber identity system 632 instead can be manufactured into the device 600, thereby obviating the need for a slot interface 630.

The device 600 can include an image capture and processing system 634. Photos and/or videos can be obtained via an associated image capture subsystem of the image system 634, for example, a camera. The device 600 can also include a video systems component 636 for processing, recording, and/ or transmitting video content.

A location component 638 can be included to send and/or receive signals, such as, for example, GPS data, assisted GPS data, triangulation data, combinations thereof, and the like. The device 600 can use the received data to identify its location or can transmit data used by other devices to determine the device 600 location.

The device 600 can include a power source 640 such as batteries and/or other power subsystem (AC or DC). The power source 640 can be single-use, continuous, or rechargeable. In the case of the latter, the power source 640 can interface with an external power system or charging equipment via a power I/O component 642.

The law does not require and it is economically prohibitive to illustrate and teach every possible embodiment of the present claims. Hence, the above-described embodiments are merely exemplary illustrations of implementations set forth for a clear understanding of the principles of the application. Variations, modifications, and combinations may be made to the above-described embodiments without departing from the scope of the claims. All such variations, modifications, and combinations are included herein by the scope of this disclosure and the following claims.

What is claimed is:

1. A method comprising:
    receiving a delete request message, at a network contact database, from a first device associated with a first user, the delete request message comprising a text message generated by the first device, the text message comprising a destination number that identifies a second device from which contact information associated with the first user is to be deleted and a character string that instructs the network contact database to delete the contact information associated with the first user from the second device, and the second device being associated with a second user and comprising a local contact database of the second device;
    causing, by a processor, contact information associated with the first user from the network contact database to be deleted in response to the delete request message; and
    causing, by the processor, a synchronization process to be initiated between the local contact database of the second device and the network contact database to delete, from the local contact database of the second device, the contact information associated with the first user.

2. The method of claim 1, wherein the delete request message further comprises a network contact database number identifying the network contact database, and wherein the destination number also identifies an entry within the network contact database corresponding to the second device.

3. The method of claim 1, further comprising executing an action to ensure that the contact information deleted in connection with the synchronization process is not subsequently added to the local contact database of the second device.

4. The method of claim 3, wherein executing the action comprises causing a flag to be set at the second device, the flag acting to prevent the contact information from being transferred from the network contact database to the local contact database of the second device following deletion of the contact information at the second device during the synchronization process.

5. The method of claim 3, wherein executing the action comprises, as part of initiating the synchronization process, forwarding the delete request message to the second device.

6. The method of claim 1, wherein the second device is a handheld computer associated with the second user.

7. The method of claim 1, wherein the second device is a computer selected from a group of computers consisting of: a desktop computer associated with the second user; a laptop computer associated with the second user; and a tablet computer associated with the second user.

8. A non-transitory computer-readable storage medium comprising instructions that, when executed by a processor, cause the processor to perform operations comprising:
    receiving a delete request message, at a network contact database, from a first device associated with a first user, the delete request message comprising a text message generated by the first device, the text message comprising a destination number that identifies a second device from which contact information associated with the first user is to be deleted and a character string that instructs the network contact database to delete the contact information associated with the first user from the second device, and the second device being associated with a second user and having a local contact database of the second device;

deleting the contact information corresponding to the first user from the network contact database in response to the delete request message; and initiating a synchronization process between the local contact database of the second device and the network contact database to delete, from the local contact database of the second device, the contact information associated with the first user.

9. The non-transitory computer-readable storage medium of claim 8, wherein the delete request message further comprises a network contact database number identifying the network contact database, and the destination number also identifies an entry within the network contact database corresponding to the second device.

10. The non-transitory computer-readable storage medium of claim 8, wherein the operations further comprise executing an action to ensure that the contact information deleted is not subsequently added to the local contact database of the second device.

11. The non-transitory computer-readable storage medium of claim 10, wherein executing the action comprises causing a flag to be set at the second device, the flag acting to prevent the contact information from being transferred from the network contact database to the local contact database of the second device following deletion of the contact information at the second device during the synchronization process.

12. The non-transitory computer-readable storage medium of claim 10, wherein executing the action comprises, as part of initiating the synchronization process, forwarding the delete request message to the second device.

13. The non-transitory computer-readable storage medium of claim 8, wherein the second device is a handheld computer associated with the second user.

14. The non-transitory computer-readable storage medium of claim 8, wherein the second device is a computer selected from a group of computers consisting of: a desktop computer associated with the second user; a laptop computer associated with the second user; and a tablet computer associated with the second user.

15. A method comprising:

generating a delete request message at a first device associated with a first user, the delete request message requesting deletion of contact information associated with the first user;

sending, from the first device, the delete request message for delivery to a second device associated with a second user;

after sending the delete request message, determining whether, at the first device, to allow the first user to provide an authorization to have the contact information associated with the first user deleted from the second device, wherein the contact information will not be deleted at the second device without the authorization having been provided at the first device;

receiving, at the first device, a request for the authorization to have the second device delete the contact information; and receiving, at the first device, from the first user, and in response to receiving the request, the authorization from the first user to have the second device delete the contact information associated with the first user.

16. The method of claim 15, further comprising sending, in response to receiving the authorization, an authorization message for delivery to the second device for authorizing deletion of the contact information at the second device.

17. The method of claim 15, further comprising presenting to the first user, a prompt for authorizing the delete request message; and wherein the authorization is received from the first user in response to the prompt.

18. The method of claim 15, wherein the second device is a handheld computer associated with the second user.

* * * * *